United States Patent [19] [11] 4,182,028
Epstein et al. [45] Jan. 8, 1980

[54] HERMETICALLY SEALED BUTTON-TYPE ELECTROCHEMICAL CELL AND METHOD FOR MAKING SAME

[75] Inventors: James Epstein, Sharon; Nikola Marincic, Winchester, both of Mass.

[73] Assignee: GTE Laboratories Inc., Waltham, Mass.

[21] Appl. No.: 870,429

[22] Filed: Jan. 18, 1978

Related U.S. Application Data

[62] Division of Ser. No. 711,039, Aug. 2, 1976, abandoned.

[51] Int. Cl.² .......................... H01M 6/00; H01M 6/32
[52] U.S. Cl. ..................................... 29/623.2; 429/57; 429/72; 429/164; 429/174; 429/184
[58] Field of Search ................. 29/623.2, 623.1, 623.4, 29/422; 429/162, 163, 164, 57, 59, 60, 118, 72, 185, 82, 94, 184, 173, 174

[56] References Cited

U.S. PATENT DOCUMENTS

| | | | |
|---|---|---|---|
| 3,057,949 | 10/1962 | Prell, Jr. | 29/623.2 |
| 3,064,065 | 11/1962 | Belove | 429/185 |
| 3,380,857 | 4/1968 | Bilhorn | 429/173 |
| 3,427,205 | 2/1969 | Plitt et al. | 429/183 |
| 3,982,958 | 9/1976 | Newman | 429/57 |
| 4,011,371 | 3/1977 | Hallett et al. | 429/174 |

Primary Examiner—C. W. Lanham
Assistant Examiner—Daniel C. Crane
Attorney, Agent, or Firm—Fred Fisher

[57] ABSTRACT

An ultra-thin hermetically sealed button-type electrochemical cell is disclosed comprising a pair of mating metallic housing members, at least one of which is generally dish shaped to define an enclosed space therebetween. A peripheral opening defining a fill port is formed in one of the housing members, preferably at the junction formed by the mating surfaces. The interfacing surfaces of the cell housing members are welded together subsequent to the insertion of the internal cell components and prior to the addition of the electrolyte to form a hermetic seal. The electrolyte may then be added and the fill port hermetically sealed by welding. Owing to its relatively small size, the fill port may be quickly sealed so that the heat generated during the weld process is insufficient to volatilize the electrolyte. One of the housing members has a facial hole containing a glass-to-metal seal through which an electrically conductive metal terminal structure extends and located such that the heat of welding may be dissipated by the housing members without adversely affecting the glass-to-metal seal.

8 Claims, 2 Drawing Figures

HERMETICALLY SEALED BUTTON-TYPE ELECTROCHEMICAL CELL AND METHOD FOR MAKING SAME

This is a division, of application Ser. No. 711,039, filed Aug. 2, 1976 now abandoned.

BACKGROUND OF THE INVENTION

The present invention is related generally to primary electrochemical cells and is more particularly concerned with a novel method of construction for such cells, and the cells produced by such method which results in a hermetically sealed ultra-thin compact configuration.

Primary electrochemical cells are utilized for a wide variety of applications and are commonly available in a significant assortment of sizes and shapes. Certain of these applications require that the cell be hermetically sealed to preclude the possibility of the contents escaping into the surrounding environment. Examples of such applications include space installations, where the cells are used in vacuum environments, and heart pacemakers where the environment is the human body. It may be appreciated that the reliability of these cells is extremely important and that protection against leakage of the contained electrolyte is a predominant consideration. Another application for electrochemical cells which is of continuing importance is their incorporation into electronic watches. Cells used for these purposes are required to supply low currents over extended periods of time so that hermetic sealing again is a desired feature.

The desirability for compact cell configurations in applications such as those above is readily apparent. Primary electrochemical cells having both the requisite compact configuration and the necessary discharge capacity comprise electrochemical systems having an alkaline metal anode such as lithium, a carbon or $(C_4F)_n$ cathode, and an electrolyte comprising a solute dissolved in an inorganic oxyhalide or thiohalide solvent. The cathode material in such a system catalyzes the electrochemical decomposition of the solvent thereby enabling the otherwise dead weight of electrolyte solvent to be utilized as a source of electrical energy.

SUMMARY OF THE PRIOR ART

Although hermetically sealed button-type cells have heretofore been unavailable, non-hermetic seals have been disclosed. For example, an ultra-thin button-type cell having the foregoing electrochemical system is disclosed in co-pending U.S. patent application Ser. No. 612,056, filed Sept. 10, 1975, and assigned to the assignee of the present application. The electrochemical system of that cell comprises a thin alkaline metal anode disk fitting within and in mechanical and electrical contact with the inner surface of a first cover member, a thin preformed porous carbon cathode disk formed with a mechanical binder and in mechanical and electrical contact with the inner surface of a second cover member, a thin porous separator interposed between and in contact with the anode and the cathode, and an effective quantity of an electrolytic solution comprising a solute dissolved in an inorganic oxyhalide or thiohalide solvent diffused throughout the cathode disk and the separator. The outer rim of the first cover member fits within the outer rim of the second cover member so that a disk shaped space is formed therebetween. An electrically insulating sealing gasket is positioned between the outer rims of the cover members to electrically insulate the cover members from each other so that the respective cover members may act as the terminals of the electrochemical cell. The outer rim of the first cover member is compressed against the sealing gasket, thereby forcing the sealing gasket against the second cover member to seal the primary cell. The seal is formed when the insulating plastic or rubber gasket is placed between the two metallic covers and one of them is crimped to mechanically arrest the second without making direct electrical contact therewith. It may be appreciated that the gasket material deforms in the process to conform to the shape of the interfacing cover surfaces.

A major advantage of these seals is the low cost of materials, the speed at which the cells may be closed with semi-automatic and fully automatic equipment, and the minimum space required for the seal components. A major disadvantage of this type of seal, however, is the finite leakage rate through the gasket material. Additionally, the inherent characteristic of all polymers to cold flow under pressure causes a release in the stress at the crimp area, thereby allowing the liquid electrolyte to leak between the covers from the interior of the cell. Both the permeation through, and the leakage around the gasket contribute to the loss of electrolyte during storage or service life of the cell. A resulting loss of cell capacity as well as such undesirable side affects as corrosion of the cover understandably impose serious restrictions on the cell, particularly in such applications as those listed above. The following U.S. Patents may be of interest insofar as they were cited against applicants' parent application, Ser. No. 711,039, filed Aug. 2, 1976, now abandoned:

| U.S. Pat. No. | Patentee |
| --- | --- |
| 3,380,857 | Bilhorn |
| 3,427,205 | Plitt, et al. |
| 3,982,958 | Newman |
| 4,011,371 | Hallett, et al. |
| 3,064,065 | Belove |

SUMMARY OF THE INVENTION

Accordingly, a hermetically sealed button-type electrochemical cell and a method for making same are provided. The cell comprises a pair of mating metallic housing members, at least of one of which is generally disk-shaped to define an enclosed space therebetween. A peripheral opening defining a fill port is formed in one of the housing members. Additionally, one of the housing members has a facial hole containing a glass-to-metal seal through which an electrically conductive metal terminal structure extends. The terminal structure is electrically connected to one of the electrodes within the enclosed space. The interfacing surfaces of the cell housing members are welded together subsequent to the insertion of the internal cell components and prior to the addition of the electrolyte to form a hermetic seal. The electrolyte may then be added and the fill port hermetically sealed. Owing to the relatively small size of the fill port, preferably about 0.020 inches (0.5 mm), it is quickly sealed and the little heat thereby generated is insufficient to volatilize the electrolyte so that the full quantity of electrolyte remains within the cell.

It will be appreciated from the following detailed description that the closure and sealing of the peripheral fill port allows the housing to dissipate the generated heat without adversely affecting the glass-to-metal seal surrounding the terminal structure. Additionally, by eliminating the cell gasket from the button-type cell construction, as theretofore known, a larger internal cell volume results, thereby further increasing the maximum discharge capacity of the cell.

Further objects, advantages and features of the invention will be apparent from the following detailed description of the preferred embodiment when considered in conjunction with the accompanying drawings.

DESCRIPTION OF THE PREFERRED EMBODIMENT

Figure 1:
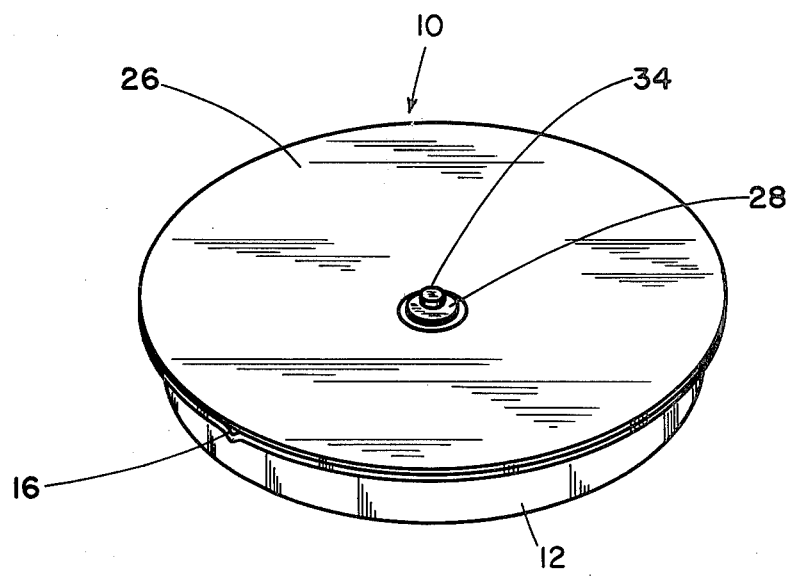
FIG. 1 is a perspective view of a button-type electrochemical cell constructed in accordance with the present invention.

In referring to the Figures throughout the remaining portion of the disclosure, like reference numerals will be used to designate identical elements therein.

Referring initially to FIG. 1, there is shown a hermetically sealed button-type electrochemical cell constructed in accordance with the invention and shown generally by the reference numeral 10. The cell 10 is approximately 2 to 3 mm in height and comprises a first generally dish-shaped housing member 12 and a second housing member which may simply comprise a substantially flat cover 26. A fill port 16 is formed on the periphery of the first housing member 12 and is shown in FIG. 1 as a spout-like projection at the juncture with the cover 26. It will be appreciated, however, that a peripheral fill port could alternatively be located on the face of either housing member or on the side of the housing member 12. The face of the cover 26 includes a hole 30 containing a glass-to-metal seal 28 through which a solid terminal structure 34 extends.

Figure 2:
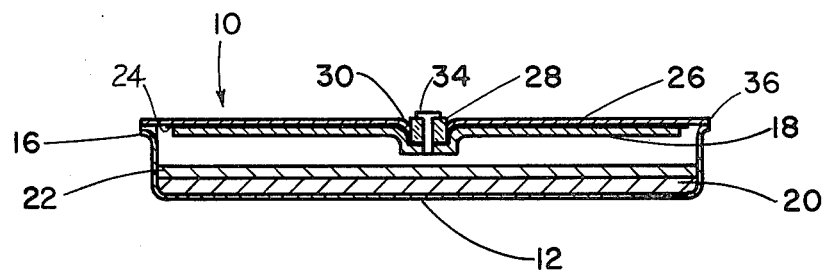
FIG. 2 is a side elevation view showing a cross section of the cell in FIG. 1.

Turning to FIG. 2, the terminal structure 34 is shown passing through the glass-to-metal seal 28 and coupled to one electrode of a spaced-apart electrode pair 18, 20 contained within the space enclosed by the housing members. The electrode 18 may be either the cathode or anode of the electrochemical cell 10. The terminal 34 thereby provides external connection to the electrode 18. The second electrode 20 is shown within the first housing member 12 and in electrical and mechanical contact therewith to allow the housing member 12 itself to serve as the second terminal of the cell. Located between the electrodes 18, 20 is a separator 22 which prevents the two electrodes from mechanically contacting each other and internally shorting the cell.

In the cells of the instnt invention, the cathode material is preferably a preformed cathode disk which may comprise such materials as graphite, carbon black, acetylene black, or an intercalation compound of carbon and fluorine represented by the general formula $(C_4F)$ if desired. In this preferred form, the cathode is a thin sheet-like disk wherein a mixture of graphite carbon black particles are cured with a mechanical binder on a metallic current collector which in turn may be a nickel screen. Details of such cathode construction may be found in copending U.S. patent application Ser. No. 619,754, filed Oct. 6, 1975, and assigned to the assignee of the present invention. Another suitable cathode construction may be found in U.S. Pat. No. 3,907,593 which issued on Sept. 23, 1975, and is also assigned to the assignee of the present invention. Both of these disclosures are hereby incorporated by reference.

The anode for the hereindescribed cell may be one of the alkaline metals and is preferably lithium. The anode structure may include a suitable supporting metal grid made from monel metal, nickel, or stainless steel.

The separator 22 is a thin porous structure interposed between the cathode and anode to prevent electrical contact therebetween and may be constructed from such materials as thin sheets of glass fiber paper, non-woven porous, polytetrafluoroethylene, and zirconia.

The electrolyte employed in the present cell comprises a liquid, covalent, inorganic oxyhalide or thiohalide solvent as a depolarizer, and a solute dissolved therein. An effective quantity of a suitable liquid depolarizer which can be electrochemically reduced on the high surface area carbon cathode is contained within the cell and is in contact with both the anode and cathode thereof. Due to the porosity of the cathode material and the separator, the depolarizer is diffused throughout both components. The choice of a depolarizer is dictated by the particular anode material selected; when the anode is lithium, it is preferred that the liquid depolarizer be an inorganic oxyhalide of phosphorous or sulfur, particularly one which is selected from the group consisting of phosphorous oxychloride, thionyl chloride and sulfuryl chloride.

Having described the structural characteristics of the present cell, attention is now directed to the method by which the illustrated cell is constructed and to the manner in which those structural elements permit the production of a hermetically sealed button-type cell.

One advantage associated with the illustrated cell is that the glass-to-metal seal 28 and the terminal 34 may be built into the cover 26 to form a cover subassembly prior to the cell assemblage. Thus, the terminal 34 need not be manipulated during the cell assembling procedures where the surrounding seal has been susceptible to damage. Accordingly, the cover subassembly is constructed by first securing the terminal 34 within the glass-to-metal seal 28. Techniques for accomplishing glass-to-metal sealing are known in the art and basically comprise the placing of a generally annular glass bead within the facial hole 30 of the cover 26 and the insertion of the terminal structure 34 through the central bead opening. The glass bead 28 is then fused, and the glass-to-metal seal formed, by subjecting the assemblage to high temperatures. As will become more readily apparent, the glass-to-metal seal not only secures the terminal 34, but additionally electrically insulates the terminal 34 from the cover 26 and hermetically seals the hole 30.

In the preferred embodiment, a thin anode disk 18 is concentrically mounted on the cover 26 and electrically coupled to one end of the terminal 34. To electrically insulate the anode 18 from the cover 26, a layer of insulating material 24 which is non-reactive with the electrolyte, is interposed therebetween. The insulating material 24 may comprise glass or glass-fiber paper, and is held against the cover 26 by the anode 18.

A thin cathode disk is similarly placed within the housing member 12 and is in both mechanical and electrical contact therewith, allowing the housing member 12 to serve as the second cell terminal. The thin porous separator 22 is placed on top of the cathode disk and the cover assembly is mounted on the housing member 12. The interfacing surfaces of the housing members 12 and the cover 26 are then welded so as to form a hermetic seal therebetween. The insulator 24, as well as the anode 18, is sized to extend only to a point radially inward from the abutting surfaces of the cover and housing member. The heat generated during the welding process may thereby be dissipated by the cell housing without inducing a damaging thermal shock to the insulator 32 on the glass-to-metal seal 28. The housing members are welded together along substantially the entire junction therebetween with the exception of the area contiguous to the fill port 16. In the preferred embodiment, the port is approximately 0.020 inches (0.5 mm) across and represents approximately 0.065% of the cell circumference. After the weld has been complete, electrolyte is introduced into the cell through the port 16, which may then be flattened and spot-welded shut. Because the opening of the port 16 is relatively small, it is quickly sealed. It may be noted that certain electrochemical cells of the prior art have comprised fill ports formed from hollow metal feed-throughs which have been brought out through a glass-to-metal seal in a manner similar to the terminal 34 shown in FIG. 2 herein. These feed-throughs were sealed subsequent to introduction of the electrolyte and thereafter utilized as terminals. It may be appreciated that the welding of these feed-throughs after addition of the electrolyte to form the hermetic seal is undesirable for cells of this size, since the glass-to-metal seal is susceptible to cracking when exposed to thermal shocks.

The foregoing represents a preferred embodiment of the present invention, and it is recognized that many obvious changes and modifications may be made by one skilled in the art. These changes and modifications are within the scope of the invention which is defined in the appended claims.

We claim:

1. A method for producing a hermetically sealed cell from elements including a mating metallic can and metallic cover comprising the steps of:
   (a) forming a peripheral fill port in either of said elements;
   (b) assembling all dry, non-electrolytic components within said elements;
   (c) welding said can to said cover, without obstructing said fill port, to substantially hermetically seal said can to said cover;
   (d) filling the space enclosed by said can and said cover through the fill port with an effective quantity of electrolyte; and
   (e) welding the fill port closed to hermetically seal the enclosed cell.

2. A method for producing a hermetically sealed cell from elements including a mating metallic can and metallic cover comprising the steps of:
   (a) forming a peripheral fill port in either of said elements;
   (b) inserting an electrically conductive metal terminal member through a facial hole formed in said metallic cover;
   (c) forming a glass-to-metal seal within the facial hole to secure the terminal member therein while insulating it from said cover;
   (d) assembling all dry, non-electrolytic components within said elements;
   (e) positioning said can and said cover in their mating relationship;
   (f) welding the mating surfaces of said can and said cover without obstructing the fill port to substantially hermetically seal the space enclosed by said can and said cover;
   (g) filling the enclosed space through the fill port with an effective quantity of electrolyte; and
   (k) welding the fill port closed to hermetically seal the enclosed cell.

3. A method for producing a hermetically sealed button-type cell comprising the steps of:
   (a) forming a peripheral fill port in either of a pair of mating metallic housing members;
   (b) inserting an electrically conductive metal terminal member through a facial hole formed in one of the housing members;
   (c) forming a glass-to-metal seal within the facial hole to secure the terminal member therein while insulating it from said one housing member;
   (d) placing a first electrode of a selected electrochemical system within said one housing member;
   (e) insulating the first electrode from said one housing member;
   (f) placing a second electrode of the selected electrochemical system within the other housing member;
   (g) inserting a separator between the opposing electrodes,
   (h) positioning the housing members in their mating relationship;
   (i) welding the mating surfaces of the housing members without obstructing the fill port to substantially hermetically seal the space enclosed by the housing members;
   (j) filling the enclosed space through the fill port with an effective quantity of electrolyte; and
   (k) welding the fill port closed to hermetically seal the enclosed cell.

4. The method as recited in claim 3 wherein step (d) includes placing said first electrode in electrical contact with said terminal member, and wherein step (f) includes placing said second electrode in electrical contact with said other housing member.

5. A cell produced by the method recited in claim 1.
6. A cell produced by the method recited in claim 2.
7. A cell produced by the method recited in claim 3.
8. A cell produced by the method recited in claim 4.

* * * * *